Patented July 15, 1947

2,424,086

UNITED STATES PATENT OFFICE 2,424,086

PRODUCTION OF OLEFIN OXIDES

Ingolfur Bergsteinsson, Billings, Mont., and Harry de V. Finch, Berkeley, Calif., assignors to Shell Development Company, San Francisco, Calif., a corporation of Delaware No Drawing. Application August 11, 1943, Serial No. 498,431

9 Claims. (Cl. 260—348.5)

This invention relates to the production of olefin oxides by effecting the direct catalytic oxidation of olefins with oxygen, and more particularly to a commercially attractive process for the catalytic oxidation of olefins, particularly ethylene, to the corresponding olefin oxides which comprises treating an olefin with oxygen or an oxygen-containing gas in the presence of a catalyst composition comprising silver metal and a carrier or support therefor which essentially consists of or comprises elemental silicon, silicon carbide, or a mixture of elemental silicon and silicon carbide.

Numerous processes have been proposed for preparing olefin oxides by reacting olefins with oxygen at elevated temperatures in the presence of catalysts consisting of or comprising silver metal.

It is the object of this invention to provide a process which, by virtue of the characteristics of the novel catalyst used in its execution, is superior to any of the processes heretofore proposed in that it can be executed more economically on a commercial scale.

The definite superiority of the process of the invention over known processes for the direct catalytic oxidation of olefins to olefin oxides can be attributed to the use of improved catalyst compositions which comprise silver metal and a support or carrier for the silver which consists of or comprises elemental silicon, silicon carbide, or both elemental silicon and silicon carbide.

Many catalyst compositions containing silver metal and a support or carrier therefor are known and have been proposed for use in the oxidation of olefins to olefin oxides. Numerous different carrier materials have been used and proposed for use in such silver-containing compositions, including charcoal, pumice, magnesia, Alundum, alumina, kieselguhr, fuller's earth and the like. We have found that none of the previously proposed carrier materials provide silver-containing catalysts which can, on the basis of initial activity, length of active life, high thermal conductivity, durability in use and reproducibility, be considered equivalent to or anywhere near as good as the improved catalyst compositions herein defined for use in the technical scale production of olefin oxides, particularly ethylene oxide.

The process of the invention has, among others, the following advantages over known processes for the direct catalytic oxidation of ethylene to ethylene oxide. Higher yields of ethylene oxide, based on the total ethylene oxidized, can be obtained. In fact, yields as high as 70% have been obtained. Higher conversions of ethylene to ethylene oxide per pass through the catalyst-containing zone can be obtained. Under favorable conditions, conversions per pass as high as 55% have been obtained. The process is more readily adapted to economical technical scale production of ethylene oxide because of the long active life and physical durability of the catalyst; these factors increase the productive capacity of the plant by materially increasing the time period between shut-downs to replace or reactivate the catalyst. In continuous operations over periods as long as 400 hours, no decline in activity of the catalyst has been detected. Furthermore, production costs and capital costs are lower because for the production of a given amount of ethylene oxide proportionately less catalyst is needed, and, since higher yields and conversions per pass are obtainable, ethylene oxide recovery equipment of lower capacity and initial cost can be used and recovery costs lowered. With some of the preferred catalyst compositions, the amount of silver required per unit total volume of the catalyst composition, or per pound of ethylene oxide produced per day, is much less than with the known silver-containing catalyst compositions. In addition, the catalyst compositions of the invention are characterized by relatively much better thermal conductivity than catalyst compositions wherein the carrier or support for the silver metal is alumina, Alundum, fused kieselguhr, pumice and the like known porous nonmetallic materials. This property of the catalyst facilitates temperature control and maintenance of uniform catalyst bed temperatures. Other advantages of the invention will be apparent as it is better understood by reference to the following detailed description thereof.

An essential feature of the catalyst compositions used in the process of the invention is that they comprise, in addition to an effective amount of silver metal, a carrier or support material for the silver metal which consists of or comprises elemental silicon, silicon carbide or both elemental silicon and silicon carbide. The elemental silicon may be present in the catalyst composition in the amorphous and/or crystalline form. Porous aggregates comprising either elemental silicon, silicon carbide or both silicon and silicon carbide, and a suitable bonding material, such as a bonding clay, are particularly suitable support or carrier materials for use in the preparation of the catalyst compositions. Such porous aggregates are conveniently prepared by fusing the silicon and/or silicon carbide with a ceramic bonding material, and crushing or forming the resulting mass into pieces, chips, or forms of the desired shape and size. It is desirable that the porous aggregates contain at least 60% by weight, and preferably from 60% to 80% of the total aggregate mass of elemental silicon, silicon carbide or a mixture of silicon and silicon carbide. Alumina and alumina clays are good bonding materials. The amount of bonding material to be used relative to the silicon and/or silicon carbide may vary widely depending upon the particular bonding material used and to a certain extent upon the properties desired in the resulting aggregates. When alumina is used as the bonding material, we prefer, in many cases, to use such an amount of alumina that the resulting aggregates have an alumina content of from 3% to 12% by weight.

The carrier or support material is, prior to treating it to incorporate the silver metal therewith or deposit it thereon, preferably in the form in which it is desired to use the finished catalyst composition. For example, if it is desired to employ the silver-containing catalyst composition in the form of small pieces of say 8 to 14 mesh, the carrier material is, prior to treating it to incorporate the silver therewith, in the form of pieces of 8 to 14 mesh. The catalyst composition may be employed in any suitable solid form, for example, as a powder of the desired particle size, as granules, chips, rough broken pieces, pellets, rings, and the like, of the desired shape and dimensions. In many cases, the catalyst composition is conveniently employed in the form of granules or pieces of average mesh of from about 4 to 14.

A preferred catalyst composition for use in the execution of the process of the invention comprises a support or carrier material consisting of or comprising elemental silicon and/or silicon carbide and an adherent, substantially uniform, and preferably pellicular deposit of silver metal on the surface of such support or carrier material. Such catalysts have a high initial activity, are capable of retaining this high initial activity over relatively long periods of use, and are economical to prepare and use since the amount of the relatively expensive silver metal per unit volume of catalyst composition, or per pound of olefin oxide produced per given time unit, is much less than with other types of catalysts. In fact, with catalysts of this type the amount of silver metal per unit volume of catalyst composition required to give an active catalyst is quite small; catalysts of this type which contain as little as 0.7 to 0.8 gram of silver metal per 100 cc. of the catalyst composition give excellent results, whereas with other types of catalyst compositions it is necessary for equivalent results that the catalyst contain from about 10 to about 25 grams of silver metal per 100 cc. of the catalyst composition.

Catalyst compositions of this preferred type may be prepared by chemically reducing an ammoniacal solution or suspension of a silver compound in the presence of the elemental silicon— and/or silicon carbide—containing carrier material under such conditions that a thin film or mirror of silver metal is deposited on the surface of the carrier material. These preferred catalysts may be prepared by treating the support material comprising silicon, silicon carbide, or silicon-silicon carbide aggregates successively and preferably in the order named with the following reagents: a solution or suspension of a silver compound, ammonia or ammonium hydroxide, a strongly alkaline reagent such as sodium hydroxide, a further quantity of ammonia or ammonium hydroxide, and a reducing agent. Upon allowing the carrier or support material to stand in contact with these reagents, the thin film of silver, usually in the form of a silver mirror, is deposited upon the support. This forms the desired catalytic surface.

These preferred catalysts and their process of preparation are more fully described and claimed in the co-pending application, Serial No. 498,430, filed August 11, 1943, in which the following is given as a preferred embodiment of the procedure for making the preferred catalysts of the invention: A support material comprising elemental silicon, silicon carbide or silicon-silicon carbide aggregates, is added to an aqueous solution of silver nitrate, the mixture being then boiled for from 10 minutes to 30 minutes in order to thoroughly impregnate the support material with the silver nitrate solution. Ammonium hydroxide is then slowly added in an amount just sufficient to redissolve the precipitate initially formed. To this solution there is slowly added an aqueous alkaline solution, e. g. aqueous sodium hydroxide solution in an amount which may vary between a slight excess and about three times the stoichiometric equivalent required to convert the silver present to silver oxide, the amount of the added base being, in any case, sufficient to make the solution strongly alkaline. Ammonium hydroxide is then added in an amount just sufficient to dissolve the silver oxide precipitate and to maintain the silver in solution. A reducing agent, e. g. glucose, is then added to the mixture to reduce the dissolved silver compound and to precipitate the metallic silver upon the inert support material. The mixture of silvering solution, reducing solution and support material may be allowed to stand at room temperature for a period of time sufficient to effect the deposition of the desired amount of metallic silver upon the support. The time required will vary at least in part depending on the nature of the solutions used, but may be, for example, from ½ to 1½ hours. After the mixture has stood for the desired or optimum period of time, the liquid may be decanted from the catalyst, which latter may then be washed with water, for example, by decantation, to remove the water soluble material. The catalyst so prepared is in an active form and need not be subjected to an activating or other treatment. However, drying by any suitable means, as by heating or subjection to reduced pressure may be employed, if desired.

When glucose is used as the reducing agent, the glucose solution may be prepared, for example, by dissolving 80 grams of cane sugar in 800 cc. of water and adding 100 cc. of ethanol containing 3.5 cc. of concentrated nitric acid. The resulting glucose solution may be boiled for about 5 minutes and cooled to about 20° C. prior to its addition to the basic ammoniacal silver solution containing the support material.

Although as stated the catalysts are already in an active form, their activity may, in many instances, be further promoted or modified by the addition in a desired or optimum amount of any one or more of a plurality of elements or compounds which are known to promote or modify the catalytic activity of silver metal. Representative promoters are, for example, the metals, such as gold, copper, platinum, nickel, iron, etc.; the metal oxides and other metal compounds, particularly the alkali metal and alkaline earth metal oxides, hydroxides and carbonates; and some halogen compounds. The activity of the catalysts may, in some cases, be further materially increased or promoted by the addition thereto of small amounts of a sodium compound. Such promoted catalysts may be prepared by adding the desired or optimum quantity, i. e. up to about 8% calculated as percent of silver present, of a sodium compound, e. g. sodium hydroxide or sodium nitrate. The sodium compound may be conveniently added in the form of an aqueous solution which is poured over the silvered support, the excess sodium solution being then removed by decantation and the wet silvered support dried to leave a deposit of sodium compound upon the catalyst surface. In the case of catalysts prepared by precipitating the silver from a silvering solution on a support material, it has been found desirable to leave a portion of the sodium compounds contained in the silvering solution on the surface of the finished catalyst. This may be done by adding about 3 volumes of water to a quantity of freshly prepared but unwashed catalyst prepared as described above. The catalyst may then be drained and dried. This procedure leaves a residue of sodium compounds from the silvering solution on the catalyst surface and results in the formation of a particularly active catalytic surface. Promoted catalysts of this type generally give higher yields and higher conversions than do the unpromoted catalysts. They are also active at lower temperatures and are less susceptible to poisoning.

Although the foregoing represents a preferred procedure for preparing the silver catalysts of the invention, the procedure used may vary within reasonably wide limits. For instance, instead of impregnating the carrier with a silver salt solution and then adding ammonium hydroxide, an ammoniacal silver salt solution may be prepared and the carrier material impregnated therewith. Alternatively, a silvering solution comprising a suitable silver salt, an alkali metal hydroxide, ammonium hydroxide and a reducing agent may be prepared as described above prior to the addition of the support material. The support material may then be added thereto and its silvering effected in the usual manner. In such a case, however, the support material must be added substantially immediately after mixing the components of the silvering solution. Other modifications may be made as necessary without departing from the scope of the invention as defined hereinabove.

Usually a more active catalyst is formed if the silver is deposited upon a support material which has been given a preliminary treatment with a dilute solution of hydrofluoric acid. This pretreatment may be effected by immersing the support material, for example, in a 3% to 10%, preferably about a 5% solution of hydrofluoric acid for a period of about one hour.

The catalytic oxidation process of the present invention may be carried out, for example, by passing a stream of olefins or olefin-containing gases in admixture with oxygen or an oxygen-containing gas at elevated temperatures over an active catalyst of the class described above, which catalyst consists of a support material comprising silicon and/or silicon carbide and an adherent, uniform deposit of active silver, to give a reaction product consisting of or comprising the olefin oxides corresonding to the olefins present in the original mixture. Olefins capable of being thus catalytically oxidized to the corresponding olefin oxides are the normally gaseous as well as the readily volatile normally liquid hydrocarbons, such as, for example, ethylene, propylene, the butylenes, the amylenes and their homologues and suitable substitution products. The olefins may be employed individually or in mixtures thereof with each other or with other compounds. Mixtures of olefins with relatively unreactive substances, for example, mixtures of olefins and paraffins may also be employed without resorting to any separation of the olefin or olefins therefrom prior to their being subjected to the aforementioned oxidation process. Such olefins or olefin-containing mixtures may be obtained from any suitable source as, for example, from any petroleum refining operation such as distillation, thermal cracking, hydrogenation, dehydrogenation, polymerization, etc., of hydrocarbon fluids, or they may be obtained from the processes of the natural gas industry, etc.

Varying ratios of oxygen to olefin may be used, depending upon the conditions under which the oxidation is effected. It is preferred, however, to use an amount equal to or slightly in excess of the stoichiometric amount necessary to combine with the olefins present in the reaction zone. The oxygen may be introduced as free oxygen or in admixture with other gaseous materials such as air, steam, nitrogen, carbon dioxide, etc. If desired, the free oxygen may be liberated or formed from oxygen-containing substances during the operation of the process.

The process of the invention may be carried out at any suitable temperatures in the broad range of from about 100° C. to about 500° C. However, one of the advantages of the present process is that the use of the above-described class of catalysts permits the efficient oxidation of olefin hydrocarbons to the corresponding oxides with substantially increased yields over prolonged periods of operation at temperatures not exceeding about 360° C. Thus, the oxidation of ethylene to ethylene oxide may be effected at a temperature of from about 200° C. to about 360° C. in the presence of an active catalyst comprising silicon and/or silicon carbide impregnated with an adherent uniform deposit of silver. Any suitable means may be used to supply heat to the reactants or to the reaction zone or, if necessary or desired, to withdraw excess heat therefrom during the course of the reaction.

Although it is preferred to carry out the process of the invention at about atmospheric pressure, sub-atmospheric or superatmospheric pressures may also be used, if desired. The optimum pressure will, in general, be determined by the conditions of operation and the nature of the materials processed.

The reaction products resulting from the process may be subjected to any subsequent treatment to separate the desired olefin oxide or oxides. Thus, the olefin oxide may be separated from the remaining reaction products by any suitable method of separation, such as fractionation, absorption and extraction, or by a combination of these methods or steps.

The following examples are given for the purpose of illustrating the process of the invention.

*Example I*

To 100 cc. of washed crystalline elemental silicon there was added 200 cc. of a 0.147 N silver nitrate solution. To the mixture there was slowly and successively added 6 cc. of 28% ammonium hydroxide and 100 cc. of 0.8 N sodium hydroxide solution, the mixture being stirred throughout said additions. An additional 3 cc. of 28% NH₄OH was then added, and the stirring continued for about 5 minutes.

A reducing solution was prepared by dissolving 8 grams of cane sugar in 80 cc. of water, adding 10 cc. of ethyl alcohol and 0.35 cc. of concentrated HNO₃ to the sugar solution, and boiling the resulting solution for about 5 minutes.

About 12 cc. of this reducing solution was rapidly added to the above mixture of silicon and silver solution. The resulting mixture was allowed to stand for one hour with occasional shaking. The liquid was then decanted from the silvered silicon, which latter was washed. The finished catalyst contained about 2.4 grams of silver per 100 cc. of catalyst.

An ethylene-air mixture containing 17% by volume of ethylene and 83% by volume of air was passed over 25 cc. of the above-described catalyst at a temperature of about 300° C. at a rate of 60 cc. per minute. A maximum yield of 80% based on total ethylene consumed was obtained. After 100 hours of operation, the yield remained constant at 56%.

Example II

A catalyst was prepared by depositing active silver upon silicon carbide chips by the method used for depositing silver upon the support material described in Example I.

An ethylene-air mixture was passed over 25 cc. of the catalyst so prepared under the same operating conditions as those used in Example I. A yield of 53% of ethylene oxide based upon ethylene consumed was obtained.

Example III

Ceramically bonded porous aggregates of silicon carbide were prepared by fusing silicon carbide with sufficient alumina or alumina clay to give a composition containing from about 60% to about 80% by weight of silicon carbide and from about 3% to about 12% of alumina. The aggregates prepared in this manner were then etched by treating for two minutes with 5% hydrofluoric acid, washed and dried under a vacuum.

Aggregates prepared in this manner were then silvered by the method used in Example I with the exception that after the silvering operation had been completed, the spent silvering solution was then washed thoroughly with distilled water and leached with water for 6 days.

An ethylene-air mixture containing 17% by volume of ethylene and 83% by volume of air was passed over a quantity of the above-described catalyst at a temperature of about 270° C. and a contact time of about 25 seconds. After 80 hours of continuous operation, the yield of ethylene oxide based on the amount of ethylene consumed remained almost constant at 64%.

Example IV

A catalyst was prepared by depositing active silver upon granular ceramically bonded silicon carbide by the method used in the preparation of the catalyst in Example I.

An ethylene-air mixture was passed over 25 cc. of this catalyst under the same operation conditions as those employed in Example I. After 100 hours of operation, a yield of 62% of ethylene oxide based upon the amount of ethylene consumed was obtained.

Example V

Ceramically bonded silicon carbide was immersed for one hour in a 2% hydrofluoric acid solution and then thoroughly washed with water. Silver was then deposited upon this pretreated ceramically bonded silicon carbide in the manner used in the preparation of the catalyst in Example I. The finished catalyst contained 2.4 grams of silver per 100 cc. of catalyst.

An ethylene-air mixture containing one part by volume of ethylene to 5 parts by volume of air was passed over 25 cc. of this catalyst at substantially atmospheric pressure and a temperature of 290° C. The gas mixture was passed over the catalyst at the rate of 60 cc. per minute. A conversion of 51.5% per pass to olefin oxide (based upon total olefin charged) was obtained with a yield of 63% based upon total ethylene oxidized.

Example VI

A catalyst consisting of silver deposited upon ceramically bonded silicon carbide was prepared by the method used in the preparation of the catalyst in Example V.

An ethylene-air mixture consisting of 1 part by volume of ethylene to 10 parts by volume of air was passed over this catalyst at a temperature of from about 290° C. and at a rate of 55 cc. per minute. At the end of 380 hours, a yield of about 58% of ethylene oxide based on total ethylene consumed, with a conversion of about 47% of ethylene to ethylene oxide based on total ethylene charged, was obtained.

It is to be understood that the invention is not limited to the illustrative examples, conditions of operation or yields set forth herein, and that the process as described may be varied and modified, as apparent to one skilled in the art, without departing from the spirit and scope of the invention, and that the invention is to be limited only by the following claims.

We claim as our invention:

1. A process for the production of ethylene oxide by the direct catalytic oxidation of ethylene which comprises reacting ethylene with oxygen employed in excess of the stoichiometric amount necessary to combine with the ethylene and effecting the reaction at a temperature of between about 200° C. and 360° C. and in the presence of a catalyst essentially comprising a substantially inert support material which comprises silicon carbide and an adherent, uniform, pellicular deposit of silver metal formed upon and in the presence of the support material by mixing granules of the said support material with an aqueous solution of silver nitrate, adding ammonium hydroxide to the resulting mixture in an amount substantially only sufficient to dissolve any silver-containing precipitate caused by the addition of the ammonium hydroxide to the silver nitrate solution, introducing an aqueous sodium hydroxide solution into the said mixture in an amount sufficient to precipitate the silver in the form of silver oxide, adding ammonium hydroxide in an amount substantially only sufficient to redissolve the silver and maintain it in solution, reacting said solution with a glucose solution for a period of time sufficient to effect the formation of an adherent, uniform, pellicular deposit of silver upon the support material, and separating the silvered support material from the reaction mixture.

2. A process for the production of olefin oxides which comprises reacting an olefin with oxygen at a temperature of between about 200° C. and about 360° C. and in the presence of a catalyst essentially comprising a substantially inert support material which comprises silicon carbide and an adherent, uniform, pellicular deposit of silver metal formed upon and in the presence of the inert support material by mixing granules of the said support material with an aqueous solution of silver nitrate, adding ammonium hydroxide to the resulting mixture in an amount substantially only sufficient to dissolve any silver-containing precipitate caused by the addition of the ammonium hydroxide to the silver nitrate solution, introducing an aqueous sodium hydroxide solution into the said mixture in an amount sufficient to precipitate the silver in the form of silver oxide, adding ammonium hydroxide in an amount substantially only sufficient to redissolve the silver and maintain it in solution, reacting said solution with a glucose solution for a period of time sufficient to effect the formation of an adherent, uniform, pellicular deposit of silver upon the support material, diluting the silvering solution with water, separating the diluted solution from the silvered catalyst, and drying the said catalyst, thereby leaving upon the surface thereof a promoting amount of sodium compounds derived from the sodium hydroxide content of the said silvering solution.

3. A process for the production of ethylene oxide which comprises reacting ethylene with oxygen employed in excess of the stoichiometric amount necessary to combine with the ethylene at a temperature of between about 200° C. and about 360° C. and in the presence of a catalyst essentially comprising a substantially inert support material which comprises silicon carbide and an adherent, uniform, pellicular deposit of silver metal formed upon and in the presence of the support material by forming a mixture comprising the said support material and an aqueous ammoniacal solution of silver nitrate, introducing an aqueous sodium hydroxide solution into said mixture in an amount sufficient to precipitate the silver in the form of silver oxide, adding ammonium hydroxide in an amount substantially only sufficient to redissolve the precipitate, adding a reducing agent capable of reducing to metallic silver the silver compounds present in the silvering solution, thereby forming an adherent, uniform, pellicular deposit of silver upon the support material, and separating the silvered support material from the reaction mixture.

4. A process for the production of ethylene oxide by the direct catalytic oxidation of ethylene which comprises reacting ethylene with oxygen employed in excess of the stoichiometric amount necessary to combine with the ethylene and effecting the reaction at a temperature of between about 200° C. and 360° C. and in the presence of a catalyst essentially comprising a substantially inert support material which comprises silicon carbide and an adherent, uniform, pellicular deposit of silver metal formed upon and in the presence of the support material by forming a mixture comprising the support material and an aqueous ammoniacal solution of a silver salt, introducing an aqueous sodium hydroxide solution into said mixture in an amount sufficient to precipitate the silver in the form of silver oxide, adding ammonium hydroxide in an amount substantially only sufficient to redissolve the silver oxide, adding a reducing agent capable of effecting the conversion of the silver compounds present in the silvering solution to metallic silver, thereby forming an adherent, uniform, pellicular deposit of silver upon the support material, and separating the silvered support material from the reaction mixture.

5. A process for the production of ethylene oxide which comprises reacting ethylene with oxygen employed in excess of the stoichiometric amount necessary to combine with the ethylene at a temperature of between about 200° C. and about 360° C. and in the presence of a catalyst essentially comprising a substantially inert support material which comprises silicon carbide and an adherent, uniform, pellicular deposit of silver metal formed upon and in the presence of the support material by forming a mixture comprising the support material and an aqueous ammoniacal solution of silver salt, introducing an alkali metal hydroxide into said mixture in an amount sufficient to precipitate the silver in the form of silver oxide, adding ammonium hydroxide in an amount substantially only sufficient to redissolve the silver oxide, adding a reducing agent capable of effecting the reduction of the silver compounds present in the solution and the precipitation of silver therefrom for a period of time sufficient to effect the formation of an adherent, uniform, pellicular deposit of silver upon the support material, and separating the silvered support material from the reaction mixture.

6. A method for the production of olefin oxides by the direct catalytic oxidation of olefins which comprises reacting an olefin with oxygen employed in excess of the stoichiometric amount necessary to combine with the said olefin and effecting the reaction at a temperature of between about 200° C. and about 360° C. and in the presence of a catalyst essentially comprising a substantially inert support material which comprises silicon carbide and an adherent, uniform, pellicular deposit of silver metal formed upon and in the presence of the support material by forming a mixture comprising the said support material and an aqueous ammoniacal solution of a silver salt, introducing an alkali metal hydroxide into said mixture in an amount sufficient to precipitate the silver in the form of silver oxide, adding ammonium hydroxide in an amount substantially only sufficient to dissolve the silver oxide and maintain it in solution, reacting said solution with a reducing agent capable of converting the silver compounds to metallic silver, thereby forming an adherent, uniform, pellicular deposit of silver upon the support material, and separating said silvered support material from the reaction mixture.

7. A process for the production of olefin oxides which comprises reacting an olefin with oxygen in excess of the stoichiometric amount necessary to combine with the said olefin at a temperature of between about 100° C. and about 500° C. and in the presence of a catalyst essentially comprising a substantially inert support material which comprises silicon carbide and an adherent, uniform, pellicular deposit of silver metal formed upon and in the presence of the support material by forming a mixture comprising the support material and an aqueous ammoniacal solution of a silver salt, introducing an alkali metal hydroxide into said mixture in an amount sufficient to precipitate the silver in the form of silver oxide, adding ammonium hydroxide in an amount substantially only sufficient to redissolve the silver and maintain it in solution, reacting said solution with a reducing agent capable of effecting precipitation of metallic silver from the said solution for a period of time sufficient to form an adherent, uniform, pellicular deposit of silver upon the support material, and separating the silvered support material from the reaction mixture.

8. A process for the production of olefin oxides which comprises reacting an olefin with oxygen at a temperature of between about 100° C. and about 500° C. and in the presence of a catalyst essentially comprising a substantially inert support material which comprises silicon carbide and an adherent, uniform, pellicular deposit of silver metal formed upon and in the presence of the support material by forming a mixture comprising the support material and an aqueous ammoniacal solution of silver salt, introducing an alkali metal hydroxide into said mixture in an amount sufficient to precipitate the silver in the form of silver oxide, adding ammonium hydroxide in an amount substantially only sufficient to redissolve the silver oxide and maintain it in solution, reacting said solution with a reducing agent capable of precipitating metallic silver from the said solution, thereby forming an adherent, uniform, pellicular deposit of silver upon the support material, and separating the silvered support material from the reaction mixture.

9. A process for the production of olefin oxides which comprises reacting an olefin with oxygen at a temperature of between about 100° C. and about 500° C. and in the presence of a catalyst essentially comprising a substantially inert support material which comprises a member of the group consisting of silicon, silicon carbide, and silicon-silicon carbide mixtures and an adherent, uniform, pellicular deposit of silver metal formed upon and in the presence of the support material by forming a mixture comprising a substantially inert support material and an aqueous ammoniacal solution of silver salt, introducing an alkali metal hydroxide into said mixture in an amount sufficient to precipitate the silver in the form of silver oxide, adding ammonium hydroxide in an amount substantially only sufficient to redissolve the silver oxide and maintain it in solution, reacting said solution with a reducing agent capable of precipitating metallic silver from the said solution, thereby forming an adherent, uniform, pellicular deposit of silver upon the support material, and separating the silvered support material from the reaction mixture.

INGOLFUR BERGSTEINSSON.
HARRY DE V. FINCH.

REFERENCES CITED

The following references are of record in the file of this patent:

UNITED STATES PATENTS

| Number | Name | Date |
|---|---|---|
| 1,013,700 | Tone | Jan. 2, 1912 |
| 2,245,183 | Christ et al. | June 10, 1941 |
| 2,178,454 | Metzger | Oct. 31, 1939 |
| 2,040,782 | Peski | May 12, 1936 |
| 2,125,333 | Carter | Aug. 2, 1938 |
| 2,142,948 | Law | Jan. 3, 1939 |
| 2,279,469 | Law | Apr. 14, 1942 |
| 1,937,728 | Storch | Dec. 5, 1933 |
| 2,034,077 | Arnold | Mar. 17, 1936 |
| 1,739,306 | Holmes | Dec. 10, 1929 |
| 2,113,977 | Barnes | Apr. 12, 1938 |

FOREIGN PATENTS

| Number | Country | Date |
|---|---|---|
| 397,161 | Great Britain | Aug. 3, 1933 |
| 229,774 | Great Britain | Mar. 2, 1925 |
| 514,792 | Great Britain | Nov. 17, 1939 |
| 500,382 | Great Britain | 1939 |